F. K. BARTHOLOMEW.
ADJUSTABLE DROP LIGHT ATTACHMENT.
APPLICATION FILED MAR. 17, 1909.
947,709.
Patented Jan. 25, 1910.
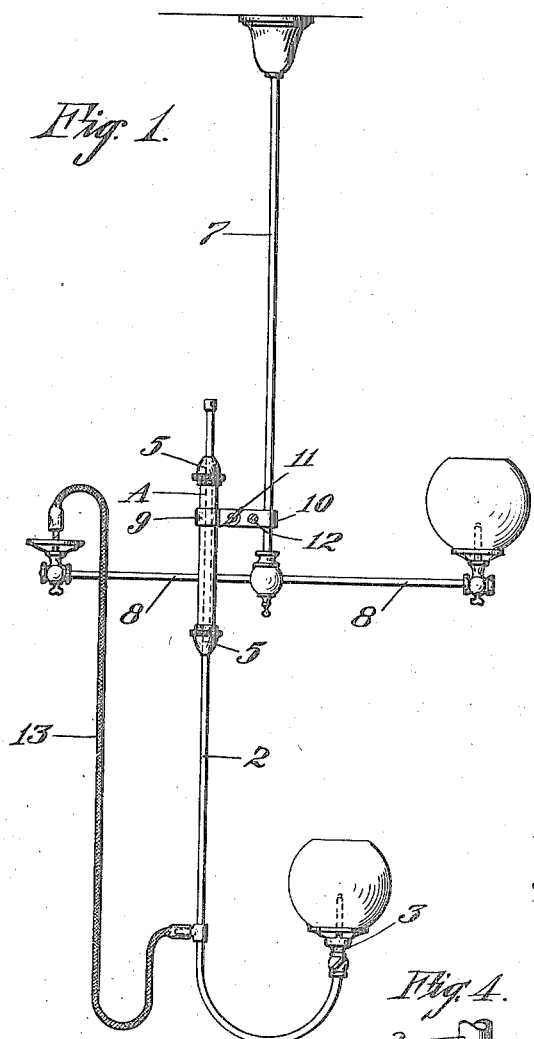
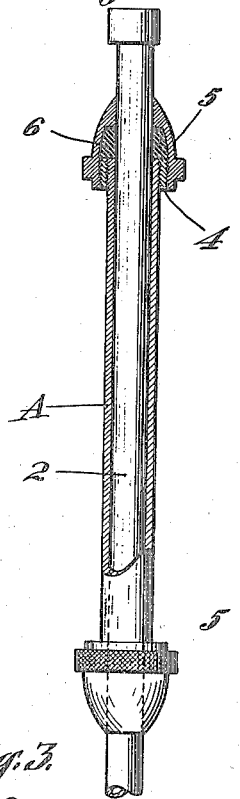
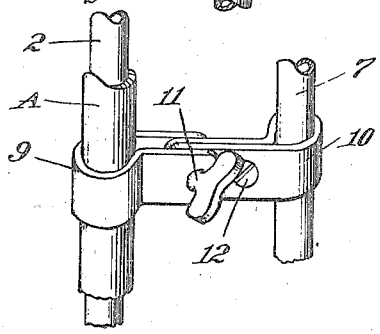
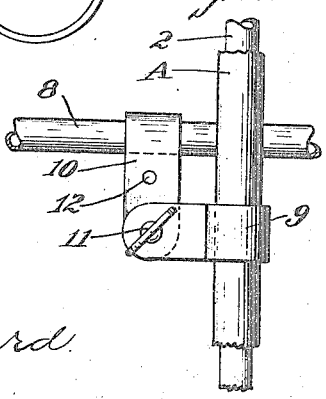
WITNESSES:
R. S. Berry
F. E. Maynard
INVENTOR
FLEURY K. BARTHOLOMEW.
BY Geo. H. Strong
HIS ATTORNEY.

UNITED STATES PATENT OFFICE.

FLEURY K. BARTHOLOMEW, OF CAMPBELL, CALIFORNIA.

ADJUSTABLE DROP-LIGHT ATTACHMENT.

947,709. Specification of Letters Patent. Patented Jan. 25, 1910.

Application filed March 17, 1909. Serial No. 483,915.

*To all whom it may concern:*

Be it known that I, FLEURY K. BARTHOLOMEW, citizen of the United States, residing at Campbell, in the county of Santa Clara and State of California, have invented new and useful Improvements in Adjustable Drop-Light Attachments, of which the following is a specification.

My invention relates to a drop-light attachment for ordinary chandeliers and gas fixtures.

The object of the invention is to provide a simple, cheap, practical drop-light attachment for any ordinary gas fixture or chandelier, by which the light may be adjusted to any desired position, which attachment can be applied to any vertical or horizontal support, and which, furthermore, will be sufficiently rigid to sustain the suspended parts.

The invention consists of the parts and the construction and combination of parts as hereinafter more fully described and claimed, having reference to the accompanying drawings, in which—

Figure 1 is an elevational view of the invention. Fig. 2 is a detailed view partly in section of the adjustment. Fig. 3 is a perspective view of the clamp as attached to a vertical support. Fig. 4 shows the clamp attached to a horizontal support.

In the embodiment of my invention, I employ a sleeve member A of suitable length and any desired description, through which the sliding gas pipe 2 passes. The sleeve A carries a spaced double packing of suitable description to form a tight sliding joint with the gas pipe 2, whereby the pipe 2 and the burner 3 which it is designed to carry may be slid up and down in the sleeve and suitably supported at any height when the sleeve is properly secured to some convenient fixed support.

The sleeve which may be of any suitable size pipe, is here shown as carrying a threaded collar 4 at each end, over which a packing gland 5 is screwed, this gland being adapted to compress the packing 6 around the gas pipe 2 and up against the end of the sleeve pipe A to form a joint of any desired stiffness. Each end of the sleeve A is provided with a similar packing, and by making the sleeve of sufficient length and providing this double packing, as shown, it will be manifest that a stiff grip is had on the drop pipe 2, and at suitable distances apart, and all carried by a single member, to-wit, the sleeve A; consequently, if the sleeve A is firmly held in position, the drop-light attachment will be quite rigid and not liable to vibration.

Any suitable means may be employed to support the sleeve and drop-light in operative position. As here shown, I employ a special type of clamp by which the sleeve may be secured either to the vertical gas pipe 7 of the chandelier, or to one or other of the horizontal pipes 8; this clamp being made in two parts 9 and 10 pivoted together at 11, with one of the parts, as 9, clamped to the sleeve A, and the other part, as 10, clamped by suitable means, as the screw 12, to a pipe 7 or 8, or equivalent support.

If the clamp is to be secured to a vertical pipe, as 7, as here shown, the clamp members 9 and 10 stand in line and are kept from turning by suitably corrugating the contiguous surfaces of the members 9 and 10.

If the drop-light is to be hung from a horizontal gas pipe, or wall fixture or the like, the clamp member 10 is simply turned down at right angles to the member 9, and the two parts locked in fixed angular position by means of the screw 11.

The drop gas pipe 2 is suitably connected with the gas supply, as by means of the flexible rubber tubing 13.

One main feature of the invention is the use of the guide sleeve A with the packing 5 at each end, whereby rigidity is given to the drop fixture, but without interfering with the proper vertical adjustments of the latter. The other feature is the adjustable clamp 9—10.

When the stuffing-boxes 5 have been adjusted to the required tension, the drop-light may be moved up or down or turned sidewise to any position, and the friction of the packing will hold the lamp at the desired level.

It is manifest or possible that the construction herein specified may be varied without departing from the principle of the invention, and I desire it to be understood that the invention is not limited to any specific form or arrangement of parts, except in so far as such limitations or their mechanical equivalents are specified in the claim.

Having thus described my invention, what I claim and desire to secure by Letters Patent is—

The combination with a chandelier, of a drop light attachment comprising a sleeve threaded at its opposite ends, a pipe passing through the sleeve, a packing at each end of the sleeve extending beyond the same and embracing the pipe, and screw glands fitting over the pipe and inclosing the packings and adapted to screw into engagement with the opposite ends of the sleeve whereby the packings are compressed around the pipe and the pipe is held at two widely separated points, flexible connections between said pipe and a gas jet and an adjustable bracket carried by the sleeve and adapted to support the same from the gas fixture.

In testimony whereof I have hereunto set my hand in presence of two subscribing witnesses.

FLEURY K. BARTHOLOMEW.

Witnesses:
J. J. CORNELL,
HARLOW M. PLIMPTON.